(12) United States Patent
Teal

(10) Patent No.: US 9,020,914 B2
(45) Date of Patent: Apr. 28, 2015

(54) AUTOMATIC SONG SELECTION

(75) Inventor: Michael D. Teal, Clayton, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1854 days.

(21) Appl. No.: 12/138,688

(22) Filed: Jun. 13, 2008

(65) Prior Publication Data

US 2009/0313302 A1 Dec. 17, 2009

(51) Int. Cl.
- *G06F 7/00* (2006.01)
- *G06F 17/30* (2006.01)
- *G11B 27/10* (2006.01)

(52) U.S. Cl.
CPC .... *G06F 17/30772* (2013.01); *G06F 17/30743* (2013.01); *G06F 17/30749* (2013.01); *G11B 27/105* (2013.01)

(58) Field of Classification Search
None
See application file for complete search history.

(56) References Cited

U.S. PATENT DOCUMENTS

| | | | | |
|---|---|---|---|---|
| 5,014,286 A | * | 5/1991 | Ransijn | 375/360 |
| 5,019,913 A | * | 5/1991 | Kiya et al. | 358/296 |
| 5,200,705 A | * | 4/1993 | Clark et al. | 324/338 |
| 5,217,378 A | * | 6/1993 | Donovan | 434/116 |
| 5,262,619 A | * | 11/1993 | Karner | 392/485 |
| 5,309,897 A | * | 5/1994 | Hassler et al. | 601/4 |
| 5,381,935 A | * | 1/1995 | Mock | 222/541.5 |
| 5,418,465 A | * | 5/1995 | Seipler et al. | 324/663 |
| 5,530,494 A | * | 6/1996 | Ogawa et al. | 351/206 |
| 5,610,660 A | * | 3/1997 | Hamano et al. | 375/240.23 |
| 5,719,922 A | * | 2/1998 | Bremer et al. | 379/88.13 |
| 5,786,994 A | * | 7/1998 | Friz et al. | 700/79 |
| 2004/0243592 A1 | * | 12/2004 | Bill | 707/100 |

FOREIGN PATENT DOCUMENTS

FR 2 857 122 1/2005

OTHER PUBLICATIONS

International Preliminary Report on Patentability for International Application No. PCT/US2008/086552 dated May 21, 2010.
Neumayer et al., "Playsom and Pocketsomplayer, Alternative Interfaces to Large Music Collections", Proceedings Annual International Symposium on Music Informationretrieval, Sep. 2005, pp. 618-623.
Zhu et al., "Perceptual Visualization of a Music Collection", Multimedia and Expo, 2005, pp. 1058-1061.
Gulik et al., "Visual Playlist Generation on the Artist Map", Proceedings Annual International Symposium on Music Information Retrieval, Sep. 2005, pp. 520-523.
International Search Report and Written Opinion for International Application No. PCT/US2008/086552 dated Jun. 4, 2009.

* cited by examiner

*Primary Examiner* — Daniel Kuddus

(74) *Attorney, Agent, or Firm* — Renner, Otto, Boisselle & Sklar, LLP

(57) ABSTRACT

A method for automatically selecting a plurality of media for rendering on an electronic device includes identifying at least first and second characteristics of media to be selected, wherein the first and second characteristics are different from one another. Further, an initial media corresponding to the first characteristic and an end media corresponding to the second characteristic are selected. Then, at least one intermediate media is selected based on a trend from the first characteristic to the second characteristic.

2 Claims, 2 Drawing Sheets

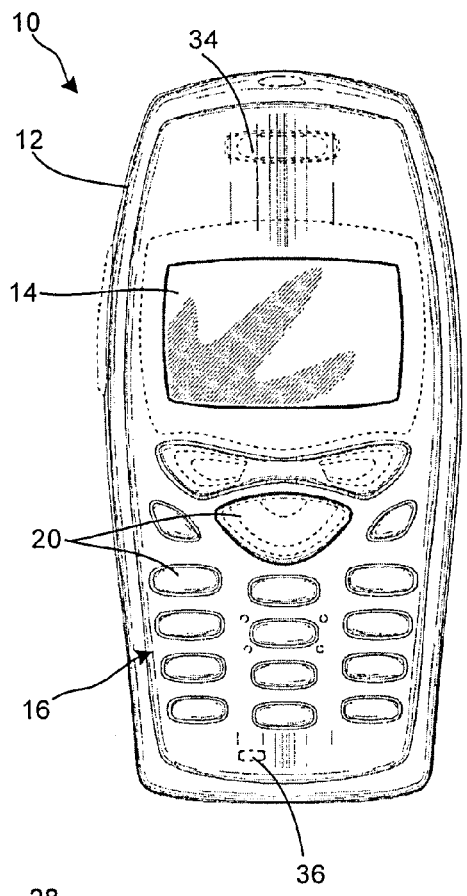
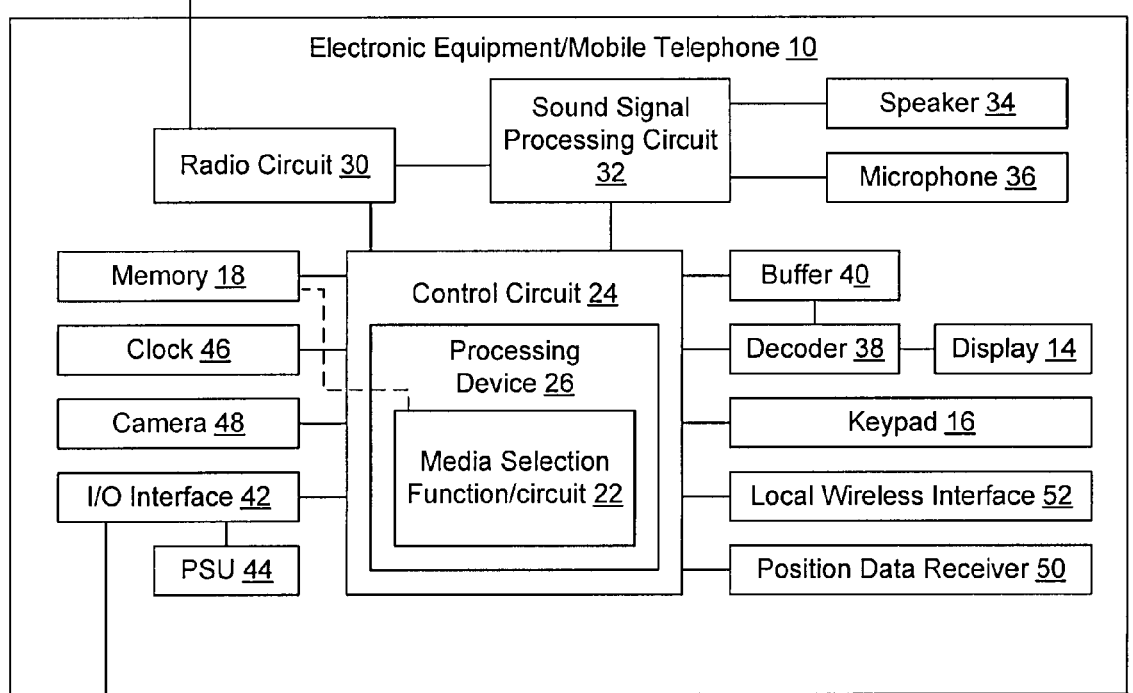
FIG. 1
FIG. 2

AUTOMATIC SONG SELECTION

TECHNICAL FIELD OF THE INVENTION

The present invention relates generally to electronic devices, such as electronic devices for engaging in voice communications and/or for playing back audiovisual content to a user. More particularly, the invention relates to a device and method for automatically selecting media to be played on the electronic device.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability and hands-free headset interfaces.

Media, such as audio and/or visual media, may be transferred to the electronic equipment for play back at a later time. This transfer may be in the form of a communication link established between the electronic equipment and another device (e.g., a short range communication link between the electronic equipment and a PC, another electronic equipment, etc.). Alternatively, the media may be transferred between devices via a removable memory card. Yet another means for transferring media to the electronic equipment may be via an internet connection with a music server (e.g., via a music purchasing service or the like). As will be appreciated, there are numerous ways in which media may be transferred to/from electronic equipment.

Regardless of the manner in which the media may be delivered to the electronic equipment, there may be a significant quantity of media stored on the electronic equipment, which can be problematic when looking for a particular type or types of media for playback on the electronic equipment.

SUMMARY

Physical memory available on electronic equipment continues to increase. Users of such electronic equipment usually take advantage of this increased memory by storing media therein. While the increased memory is advantageous in the sense that it enables more and more media to be stored on the electronic equipment, it can have some drawbacks. For example, as the amount of media stored on the electronic equipment increases, it becomes increasingly difficult to find specific media. In particular, if a user wishes to play media that suits a particular need (e.g., a play list that transitions from one style of music to another), then, for example, to create the play list, the user first scrolls through the list of media and reads each title and/or artist (or even plays a portion of the media). Then, based on the title and/or artist, the user makes a decision as to whether that particular media suits the particular need (e.g., is it a high energy song?). Then, the user either selects the media as part of the play list, or continues to scroll through the list. As will be appreciated, this process can be time consuming, particularly if a large play list is desired and/or if a large amount of media is stored on the electronic equipment.

The present invention provides a method and apparatus that enables automatic selection of media on the electronic device. More particularly, media is selected based on characteristics of the media as selected by the user. For example, a user may wish for a progression of media, such as songs, to transition from one mood to another. The user may identify the starting mood, ending mood (or select songs typical of such starting and ending moods) and a time period (e.g., a number of songs or a set time span). The electronic device then will analyze the time period and the moods and/or selected songs, and then select a progression of songs such that they transition from the starting mood to the ending mood over the specified time period. In other words, the media is selected such that characteristics of the media are averaged or trended between the user selected characteristics over the specified time period.

According to one aspect of the invention, a method for automatically selecting a plurality of media for rendering on an electronic device includes: identifying at least first and second characteristics of media to be selected, said first and second characteristics being different from one another; selecting a first media corresponding to the first characteristic; and selecting at least one intermediate media based on a trend from the first characteristic to the second characteristic.

According to one aspect of the invention, the method further includes selecting a last media corresponding to the second characteristic.

According to one aspect of the invention, the method further includes selecting an interval over which the trend from the first characteristic to the second characteristic is to occur.

According to one aspect of the invention, selecting the at least one intermediate media based on a trend includes applying a weighting factor corresponding to a current location within the specified interval and the identified first and second characteristics.

According to one aspect of the invention, the interval is based on time period or on a number of media to be selected.

According to one aspect of the invention, the method further includes selecting a third characteristic different from the first and second characteristic, and selecting at least one second intermediate media based on a trend from the second characteristic to the third characteristic.

According to one aspect of the invention, the first and second characteristics correspond to a mood or ambience created when the media is rendered, or to a style of media content.

According to one aspect of the invention, the method further includes outputting the selected media on the electronic device, wherein the output media progresses from the first characteristic toward the second characteristic.

According to one aspect of the invention, identifying at least first and second characteristics includes selecting first and second reference media, and determining the first and second characteristics based on characteristics of the first and second reference media, respectively.

According to one aspect of the invention, the media comprises at least one of audio content or video content.

According to one aspect of the invention, an electronic device includes a processor and memory; and logic stored in the memory and executable by the processor. The logic includes: logic adapted to identify or receive at least first and second characteristics of media to be selected, said first and second characteristics being different from one another; logic adapted to select a first media corresponding to the first characteristic; and logic adapted to select at least one intermediate media based on a trend from the first characteristic to the second characteristic.

According to one aspect of the invention, the device includes logic adapted to select a last media corresponding to the second characteristic.

According to one aspect of the invention, the device includes logic adapted to receive an interval over which the trend from the first characteristic to the second characteristic is to occur.

According to one aspect of the invention, the logic adapted to select the at least one intermediate media based on a trend includes logic adapted to apply a weighting factor corresponding to a current location within the specified interval and the identified first and second characteristics.

According to one aspect of the invention, the interval is based on time period or on a number of media to be selected.

According to one aspect of the invention, the device includes: logic adapted to select a third characteristic different from the first and second characteristic; and logic adapted to select at least one second intermediate media based on a trend from the second characteristic to the third characteristic.

According to one aspect of the invention, the first and second characteristics correspond to a mood or ambience created when the media is rendered, or to a style of media content.

According to one aspect of the invention, the device includes logic adapted to output the selected media on the electronic device, wherein the output media progresses from the first characteristic toward the second characteristic.

According to one aspect of the invention, the logic adapted to identify at least first and second characteristics includes: logic adapted to receive first and second reference media; and logic adapted to determine the first and second characteristics based on characteristics of the first and second reference media, respectively.

According to one aspect of the invention, the media comprises at least one of audio content or video content.

According to one aspect of the invention, the device is a mobile telephone.

According to one aspect of the invention, a computer program embodied on a computer-readable medium for automatically selecting a plurality of media for rendering on an electronic device includes code adapted to that identify or receive at least first and second characteristics of media to be selected, said first and second characteristics being different from one another; code adapted to select a first media corresponding to the first characteristic; and code adapted to select at least one intermediate media based on a trend from the first characteristic to the second characteristic.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 1 is a schematic view of a mobile telephone as an exemplary electronic device in accordance with an embodiment of the present invention.

FIG. 2 is a schematic block diagram of the relevant portions of the mobile telephone of FIG. 1 in accordance with an embodiment of the present invention.

DETAILED DESCRIPTION OF EMBODIMENTS

Figure 3:
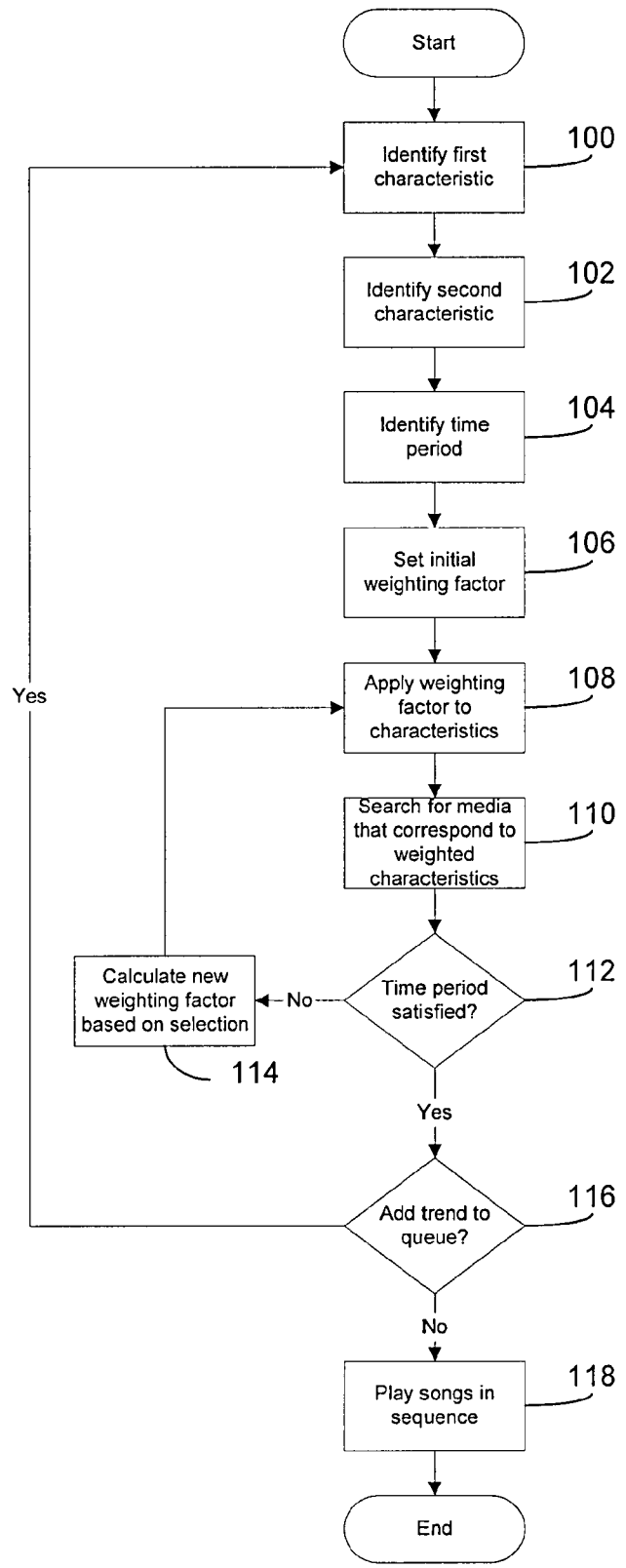
FIG. 3 is a flow chart of an exemplary media content play list creation function in accordance with the present invention.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The term electronic equipment also includes devices having suitable hardware (e.g., processor and/or memory) to enable local rendering and/or delivery of media, and/or to cause media to be rendered remotely for local delivery. Exemplary devices include computers (desk top and lap top computers), media players (e.g., mp3 players, video players, etc.), gaming devices, and the like.

In the present application, the invention is described primarily in the context of a mobile phone. However, it will be appreciated that the invention is not intended to be limited to a mobile phone and can be any type of electronic equipment.

As used herein, the terms "media" or "media content" include audio content (e.g., music and/or speech utilizing various formats including mp3, wmv, etc.) and/or video content (e.g., photographs, images, movies, etc. utilizing various formats). Further, the term "render" refers to the conversion from a first form (e.g., a file or other storage format) to a second form (e.g., an audio or graphical representation of the first form).

The present invention will now be described with reference to the drawings, wherein like reference numerals are used to refer to like elements throughout.

Referring initially to FIG. 1, an electronic device 10 is shown in accordance with the present invention. The electronic device in the exemplary embodiment is a mobile telephone and will be referred to as the mobile telephone 10. The mobile telephone 10 is shown as having a "brick" or "block" form factor housing 12 (also referred to as a "candy bar" form factor), but it will be appreciated that other type housings, such as a clamshell housing or a slide-type housing, may be utilized without departing from the scope of the invention.

The mobile phone includes a media selection function that is configured to select media for rendering on the electronic device, wherein the selections are based on characteristics of each media and characteristics selected by a user. More specifically, media are selected such that the characteristics of the media, when viewed as a whole, progress from an initial user selected characteristic to a subsequent user selected characteristic. It will be appreciated that the media selection function may be embodied as executable code that may be resident in and executed by the mobile phone 10.

The media selection function 22 (shown in FIG. 2), for example, can select media, such as music, to be played on the electronic device. More particularly, the media can be selected based on a weighted average or "trend" over a specified number of media or a specified time period. As used herein, a trend refers to the movement of media exhibiting a first characteristic to media exhibiting a second characteristic (different from the first characteristic) over a period of time. Preferably, the characteristic is a mood or ambience created by the media content, although other characteristics, such as a type of media (e.g., jazz music, rock music, metal music, etc.) may be employed. As used herein, the term "mood" refers to a state of mind or emotion, and the term "ambience" refers to an atmosphere created by the media content.

Trends are created by the specification of two or more characteristics and a period of time (e.g., a fixed time period such as thirty minutes or a total number of songs such as five songs). Selection of the media by the media selection function 22 is a weighted average based on the progression of the media sequence between characteristics (e.g., the particular time within the time period or the particular media number within the span of media and the two or more characteristics).

For example, assuming the characteristics are a mood created by songs, a user can select a first mood, wherein the media selection function 22 selects a first song that corresponds almost entirely to the first mood. The user also can specify a second mood, wherein the media selection function 22 selects a last song that corresponds almost entirely to the second mood. The user also can specify the number of songs to be selected (e.g., five songs, ten songs, etc.), or the duration in which the songs should be played (e.g., twenty minutes, one hour, etc.). Then, the media selection function 22, based on the specified number of songs or time period, can populate a play list or otherwise select songs such that the mood created by the songs gradually transitions from the first mood to the second mood.

For example, if the user selects "mood 1", "mood 2", and a play time of thirty minutes, then during minute "1" the media selection function 22 performs a search for songs that almost entirely correspond to mood 1. During minute "7", the search may be for songs that are about 75% mood 1 and 25% mood 2, while during minute "15" the search may be for songs that are split between mood 1 and mood 2 (e.g., 50/50). During minute "22", the search may be for songs that are about 25% mood 1 and 75% mood 2, and during minute "30" the search may be for songs that almost entirely correspond to mood 2.

As will be appreciated, the above time frames are merely exemplary, and the search may be performed during any moment between the beginning and end time period. For example, the first song may have a duration of three minutes and, thus, the next search will be at the three-minute mark. The three-minute mark may correspond to 90% mood 1 and 10% mood 2 (e.g., the search will be for songs that exhibit about 90% mood 1 and 10% mood 2 (assuming a thirty-minute duration)).

If the criteria for populating the play list or otherwise selecting media is based on the number of media (as opposed to a time period), then instead of weighting the search over the time period the search would be weighted based on the particular media number. For example, in a five-song play list, the search would be as follows:

song 1—the search would be for songs that almost entirely correspond to mood 1,
song 2—the search would be for songs that are about 75% mood 1 and 25% mood 2;
song 3—the search would be for songs that are split between mood 1 and mood 2;
song 4—the search would be for songs that are about 25% mood 1 and 75% mood 2;
song 5—the search would be for songs that almost entirely correspond to mood 2.

In selecting the characteristics of the media, the user may select the characteristic from a list of available characteristics. For example, the user may be presented with a selection menu that includes a list of characteristics. The user may select one or more characteristics by manipulating keys (e.g., predefined navigation keys) so as to identify the desired characteristics. Alternatively, the user may simply select a particular media (e.g., two songs) and request the media selection function 22 determine the characteristics of the songs (e.g., determine a mood or ambience created by the "reference" songs).

In searching for media that matches the progression from the first characteristic to the second characteristic and/or in determining characteristics of the reference media content, the media selection function 22 may look at a number of different metrics. Exemplary metrics are provided below. It is noted, however, that other metrics may be used in conjunction with those provided below, or independent from those provided below.

Tempo—the tempo of the media may be determined based on the beats-per-minute;
Tone—the tone of the media may be determined based on its predominant key;
Artist—The particular artist of the media; and/or
Genre—the particular genre that the media may be classified.

The metrics of potential media to be played on the mobile phone 10 can be compared with the characteristics selected by the user (taking into account the relative point within the progression between characteristics). Corresponding media then can be selected as the next media to be played on the mobile phone.

Alternatively, the media characteristics may be user definable. For example, if the user interprets song 1 as creating a "calm" mood, the user may associate such characteristic with song 1. This may be accomplished, for example, via the keys and display of the mobile phone 10, wherein the user may select a characteristic from a list of predefined characteristics, or create his/her own user defined characteristics.

When searching for matching media, a number of different media may meet the specified criteria. In this instance, the media with the best match (e.g., smallest delta between each of the metrics) may be selected. Other considerations may include, for example, whether or not the media has been previously selected, how long since the last selection, how often it has been played, the play time of the media, etc.

In addition, multiple trends may be set up in a queue, such that when one trend is complete the next trend in the queue automatically begins. For example, a queue may comprise a first user defined trend and a second user defined trend. The first user defined trend may be based on a specific time period (e.g., thirty minutes) and on mood 1 and mood 2 as described above. The second trend may be based on a number of songs and different moods (e.g., mood 3 and mood 4). As the queue is executed, the first trend executes, and when it has completed, the next trend can automatically start. Thus, the media output on the mobile phone 10 may begin with mood 1, transition to mood 2, jump to mood 3 and then transition to mood 4. Further details with respect to the media selection function 22 are provided below with respect to FIG. 3.

With continued reference to FIG. 1, the mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call, menu navigation keys for navigating through a menu displayed on the display 14, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

FIG. 2 represents a functional block diagram of the mobile telephone 10. With the exception of the media selection function 22, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform the media selection function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the media selection function 22 is executed by the processing device 26 in accordance with the preferred embodiment of the invention, such functionality could also be carried out via dedicated hardware, firmware, software, or combinations thereof, without departing from the scope of the invention. Any of these implementations may be referred to a media selection circuit 22.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive audiovisual content.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18 or derived from an incoming video data stream received by the radio circuit 30. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown). Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a system clock 46 for clocking the various components of the mobile telephone 10, such as the control circuit 24. The control circuit 24 may, in turn, carry out timing functions, such as timing the durations of calls, generating the content of time and date stamps, and so forth.

The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, hands-free adaptor, another mobile radio terminal, computer or other device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth.

Referring now to FIG. 3, a method of selecting media for a user of the mobile telephone 10 is depicted. The exemplary method of FIG. 3 describes the selection of media based on pre-selected criteria as made by the user. It will be appreciated that the method may be adapted to recommend other types of media, including, for example, video content, image content, etc. in various forms of delivery (e.g., from memory on the mobile telephone, via radio stations, podcasts, etc, to the user). Therefore, while the description herein refers to selecting music for playback on the mobile phone 10, the invention is not limited a single type of media.

Further while the media selection function 22 is described as residing primarily on the mobile telephone 10, it may reside in other locations and/or be used with other devices. For example, the media selection function 22 may reside entirely on a server or on a personal computer (PC). Once the media has been selected, the server and/or PC may transfer the selected media to the mobile telephone 10. Alternatively, the media selection function 22 may be used in conjunction with a media player that resides on the PC (e.g., the selected media is rendered on the PC as opposed to the mobile phone 10). Additionally, portions of the functionality of the method may be carried out by the mobile telephone 10 and portions of the functionality of the method may be carried out by the server or PC. For example, the functionality of the method may be embodied as executable code, such as in the form of the media selection function 22, or any other suitable form, including software, firmware, dedicated circuit components, a program stored on a computer readable media or in machine usable medium, and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The method may begin in block 100 where a first characteristic of the media is identified. As noted above, the characteristic, for example, may be a mood or ambience created by the media, the style of the media, etc. The characteristic may be identified by selecting a reference media (e.g., one or more reference songs), wherein the media selection function 22 analyzes the reference media to determine one or more of its characteristics. Alternatively, the user may select or otherwise specify the characteristic (e.g., via the keypad or via a keyboard/mouse of a PC). At block 102, a second characteristic is identified in a similar manner.

Next at block 104, the time period in which the media is to be played is selected, entered, or otherwise identified (e.g. entered into the PC or mobile phone via the keypad or selected from a list of predefined values). The time period may be expressed in actual time (e.g., minutes, hours, etc.) or based on a number of media to be played (e.g., a number of songs).

At block 106, a weighting factor, which is applied to each characteristic, is set to an initial value, e.g., the weighting factor is set to correspond substantially to the first characteristic (e.g., 100% characteristic 1, 0% characteristic 2). Then at block 108, the weighting factor is applied to the respective characteristics, and at block 110 a search is performed for media that matches the weighted characteristics. As described herein, to determine if media matches the weighted characteristics, certain metrics may be used including, but not limited to, tempo, tone, artist, genre, etc. Media that has been identified as corresponding to the weighted characteristic then can be flagged for selection. If multiple media are identified as satisfying the weighted characteristic, then other consideration may be taken into account when selecting media. These other considerations can include the playtime of the media, the number of times it has been previously selected, number of times the user has played the media, etc.

Next at block 112, it is determined if the selected media satisfies the specified time period (e.g., does the total playtime of the selected media span the specified time period or include the specified number of media?). If the period is not satisfied, then the method moves to block 114 and a new weighting factor is calculated.

The new weighting factor can take into account the number of selected media already marked for play, or the current playtime of the selected media (e.g., if the next media is the second from a requested total of five, then the weighting factor will be 75% for characteristic 1, and 25% for characteristic 2). The method then moves back to block 108 where the new weighting factor is applied to the respective characteristics, and a search is performed for media that corresponds to these weighted characteristics as described above.

Moving back to block 114, if the time period has been satisfied, then the method moves to block 116 where it is determined if another trend is to be derived (e.g. a new trend to be executed after the just derived trend). If another trend is to be derived, then the method moves back to block 100 and repeats. If another trend will not be derived, then output of the media in accordance with the trend may be output on the mobile phone 10 (or other device), as indicated at block 118.

Accordingly, the media selection function 22 enables the automatic generation of media, wherein the selected media progresses from a first user selected characteristic to a second user selected characteristic. Further, although the media selection function 22 has been described using only two characteristics, more than two are possible. For example, three or more characteristics may be specified by the user, wherein the media selection function 22 provides a trend from a first characteristic to a second characteristic, and then from the second characteristic to the third characteristic, and so on. The time associated with each progression (e.g., the progression from characteristic 1 to characteristic 2, and the progression from characteristic 2 to characteristic 3) can be independent from the other. For example, the time to progress from characteristic 1 to characteristic 2 may be specified in minutes (e.g., thirty minutes), while the time period to progress from characteristic 2 to characteristic 3 may be specified in number of media (e.g., ten songs) or is time different from the first progression (e.g., fifty minutes).

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A computer implemented method for automatically selecting a plurality of media for rendering on an electronic device, comprising:
    identifying at least first and second characteristics of media to be selected, said first and second characteristics being different from one another;
    selecting a first media corresponding to the first characteristic;
    selecting an interval over which a trend from the first characteristic to the second characteristic is to occur;
    selecting, using a processor, at least one intermediate media based on a trend from the first characteristic to the second characteristic, said selecting including applying a weighting factor corresponding to a current location within the specified interval and the identified first and second characteristics, wherein the interval is based on time period or on a number of media to be selected.

2. A computer implemented electronic device, comprising:
    a processor and memory
    logic stored in the memory and executable by the processor, said logic including
        logic configured to identify or receive at least first and second characteristics of media to be selected, said first and second characteristics being different from one another;
        logic configured to select a first media corresponding to the first characteristic;
        logic configured to receive an interval over which a trend from the first characteristic to the second characteristic is to occur;
    logic configured to select at least one intermediate media based on a trend from the first characteristic to the second characteristic, said logic configured to select including logic configured to apply a weighting factor corresponding to a current location within the specified interval and the identified first and second characteristics, wherein the interval is based on time period or on a number of media to be selected.

* * * * *